United States Patent [19]

Entezarmahdi et al.

[11] Patent Number: 4,849,835

[45] Date of Patent: Jul. 18, 1989

[54] DISK SERVO WITH PLL FOR DETECTING TIMING DEVIATIONS

[75] Inventors: Seyed Entezarmahdi, San Jose; Sassan Mortazavi, Santa Clara, both of Calif.

[73] Assignee: Unisys Corporation, Detroit, Mich.

[21] Appl. No.: 28,167

[22] Filed: Mar. 19, 1987

[51] Int. Cl.[4] .............................................. G11B 20/10
[52] U.S. Cl. ........................................ 360/60; 360/51; 331/25
[58] Field of Search ...................... 360/51, 60; 331/25, 331/48, 50; 369/50

[56] References Cited

U.S. PATENT DOCUMENTS 4,390,910  6/1983  Wilson ................................. 360/51

Primary Examiner—Alan Faber
Assistant Examiner—Kevin J. Fournier
Attorney, Agent, or Firm—John J. McCormack

[57] ABSTRACT

A technique and associated arrangement for detecting loss of phase/frequency lock in a phase lock loop, particularly for a magnetic disk drive servo system the phase lock loop detects timing asynchronism and loss of lock.

9 Claims, 2 Drawing Sheets

DISK SERVO WITH PLL FOR DETECTING TIMING DEVIATIONS

This relates to disk drive recording equipment and especially to servo techniques therefor.

BACKGROUND FEATURES

Workers in the art of making and using disk drive recording equipment are aware of certain shortcomings in the associated servo techniques and apparatus therefor. At times in a disk drive servo workers contemplate the use of a "phase lock loop" [PLL]. It is evident that "loss of lock" in a PLL arrangement can create many undesirable problems. For instance, when the associated phase lock oscillator [PLO] "unlocks", it is usually desirable (if not necessary) to protect the integrity of reported data by disabling the recorder's write current, to prevent erasure of recorded data. The subject invention addresses this problem, providing means which can quickly and accurately determine loss of lock in a phase lock loop, thus making it possible to so disable the recording means. Also, the invention makes it possible to disable power to the head-disk assembly [HDA] to prevent any damage thereto.

The problem of detecting a "lock" for a phase lock loop has been addressed before—e.g., see Memorex Disk Drive Model 3680 wherein a servo channel was arranged to monitor phase error voltage between the voltage-controlled oscillator [VCO] and the carrier signal. If this voltage exceeded a preset reference voltage, PLL "unlock" was assumed. The present invention teaches a different, and somewhat superior, method of detecting "lock" and "unlock" of a phase lock loop in a disk drive servo system.

Thus it is an object of the invention to address the above mentioned problems and difficulties and to provide at least some of the afore-described features and advantages. A more particular object is to provide a different, somewhat superior, technique for detecting loss of phase/frequency lock in a phase lock loop. A related object is to do so in a phase lock oscillator [PLO] "unsafe detection" circuit. Yet a further object is to provide the above by monitoring timing between a voltage-controlled oscillator clock and the digitized carrier signal in a PLO arrangement. A further related object is to so monitor to determine if the VCO "locks" to a harmonic of the carrier signal, whereupon timing deviation can be immediately detected. A further object is to provide the foregoing in a circuit which also detects any frequency-lock whether phase-locked or not. Insert the standard list of figures.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements.

DESCRIPTION OF THE PREFERRED EMBODIMENT

General description, background

Figure 1:
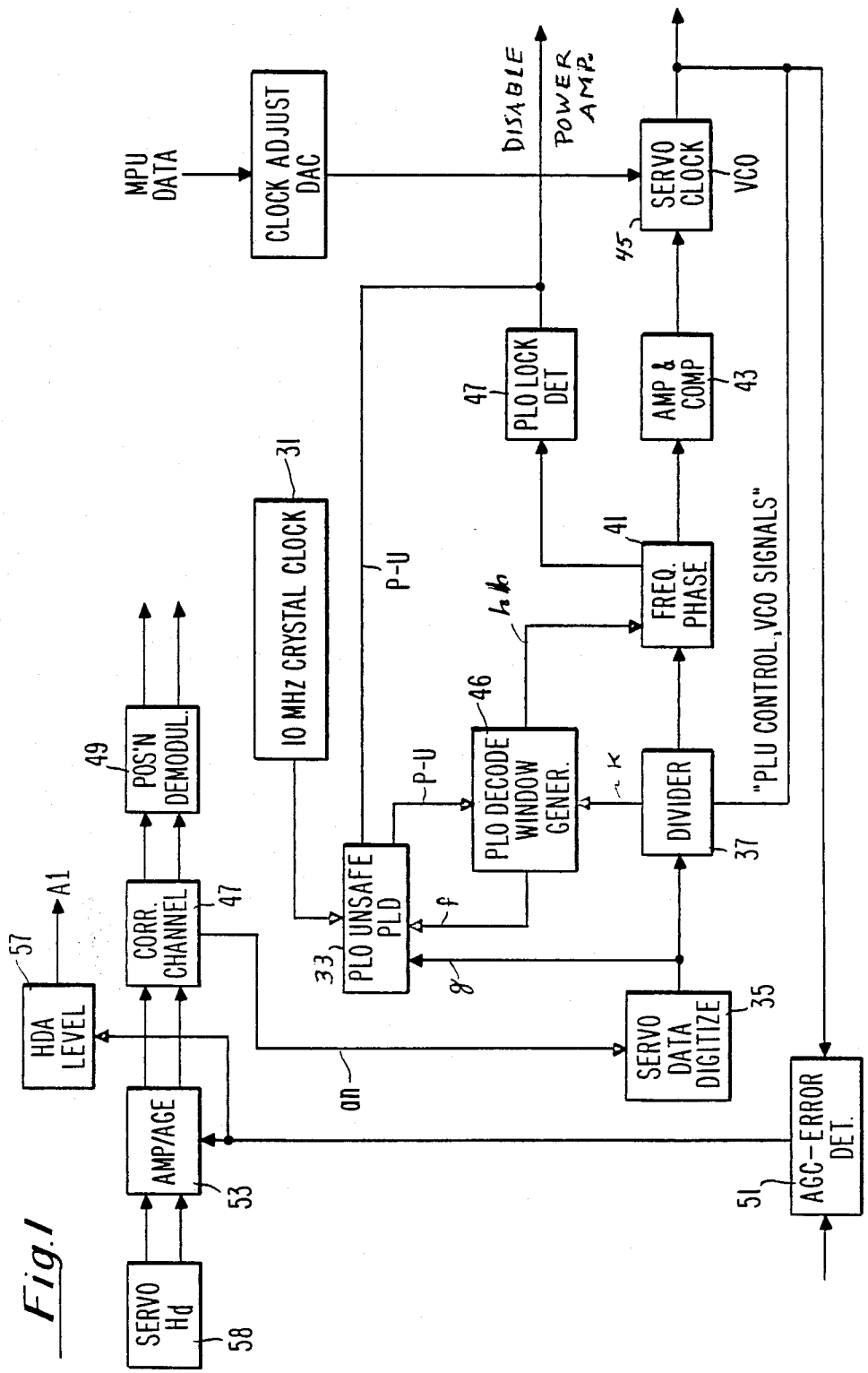
FIG. 1 is a schematic idealized block diagram of a portion of a disk drive servo adapted to include an embodiment hereof.
Figure 2:
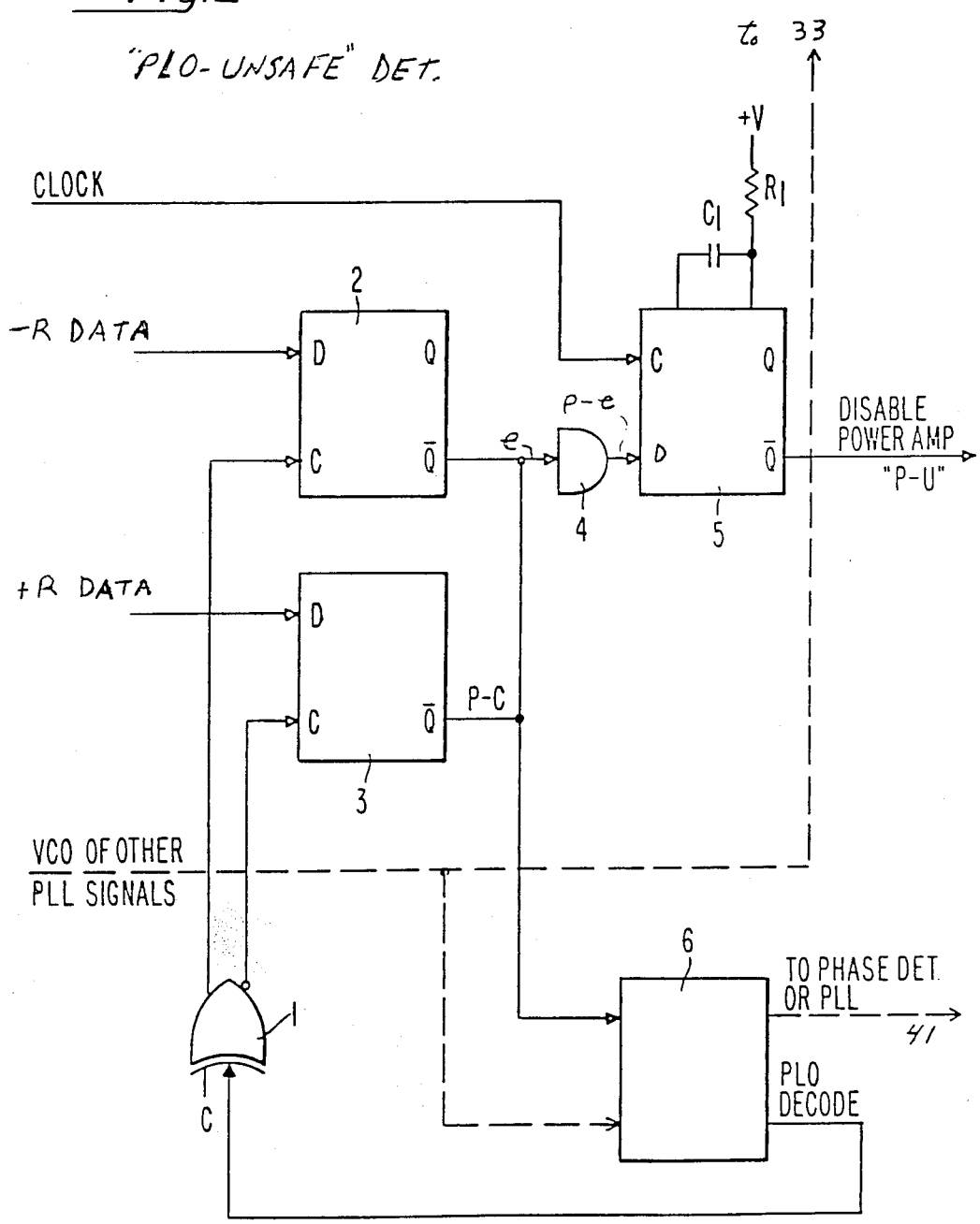
FIG. 2 is a more detailed logic diagram of a portion of the FIG. 1 embodiment.

FIGS. 1, 2 schematically illustrate a preferred "phase lock detection" embodiment according to principles of this invention (implemented in the circuit of FIG. 2). This, and other means discussed herein, will generally be understood as constructed and operating as presently known in the art, except where otherwise specified.

And, except as otherwise specified, all materials, methods and devices and apparatus herein will be understood as implemented by known expedients according to present good practice.

Introduction

Workers are aware that it is feasible to use phase detectors in a magnetic disk drive servo system such as the mentioned Memorex 3680. When these are harmonic phase detectors, it is possible to "lock" to a harmonic frequency of the carrier signal of the system without encountering a large phase-error voltage. Also, it is possible to frequency-lock yet not phase-lock while generating a small phase error. Prior methods of detecting PLO "unlock" are ineffective if the voltage-controlled oscillator [clock, VCO] "locks" to a harmonic or if it frequency-locks while not being phase-locked.

The present invention addresses these problems by providing a phase lock oscillator [PLO] "unsafe detection" arrangement (phase lock detector—e.g., see PLD in FIG. 2) in a disk drive servo which monitors the timing between the VCO clock and the digitized carrier signal. If the VCO "locks" to a harmonic of the carrier signal, the timing deviation is immediately detectable.

Also, frequency-lock can be detected in this arrangement aside from phase-lock. Thus the following embodiment will be appreciated as a different, novel, somewhat superior arrangement for detecting loss of phase/frequency lock in a phase lock loop.

FIG. 1 is a portion of a servo block diagram modified somewhat to represent a preferred embodiment of the subject invention. Here, servo signals, derived and processed as understood in the art, are inputted (signals "an") to a servo data digitizer stage 35 which outputs data signals g [identified in FIG. 2 as +R data, −R data] to a Divider stage 37 and a PLO Unsafe stage 33 [or "phase lock oscillator unsafe stage, PLD, or timing-error detector]. Detect stage 33 will be understood as preferably operated from clock signals (dd) generated by a Clock stage 31 preferably generating a 10 MHz clock signal (e.g., from a crystal source).

Stage 33 outputs reset signals (p-u) to reset a PLO Decode Generator stage 7 [window generator] which, in turn, applies plo-decode signals (f) to stage 33 and related "window signals" (hh) to a Frequency/Phase stage 41 [signals hh to phase-detect portion of the phase lock loop, PLL, as known in the art]. Data signals g are also applied to activate a Divider stage 37 which, in turn, outputs signals (k) to Decode stage 46 and to Frequency/Phase stage 41.

Stage 33 also outputs signals p-u to disable the power amplifier for the servo actuator as understood in the art.

Stage 41 outputs to an Amplification-Compensation stage 43 and to a PLO-Lock Detector stage 47.

Stage 43 outputs to a Servo Clock [or voltage-controlled oscillator VCO] #45 which outputs a servo clock signal used elsewhere in the overall servo, and also fed back [as indicated, with other PLO control signals] to Divider stage 37.

Preferably Divider 37 and Lock Det. 47 and Decode Generator 46 are provided on a single integrated circuit chip; as are Position Demodulator stage 49 and Frequency/Phase stage 41, and AGC-Error stage 51. Frequency/Phase detect stage 41 includes a "quad multiplier" putting out ±p, ±q signals. Divider 37 also puts out the following signals: "pad-clock, 3 MHz clock, and 'servo bit'".

FIG. 2 shows a preferred form for phase lock detection arrangement PLD. Here it will be understood that servo data [−R, +R] is applied to respective flip/flop stages 2, 3 ["D" type—preferably provided on a single chip], while logic outputs from an Exclusive-OR gate 1 are also applied to each such flip/flop [signals e']. The output [p-e] from these flip/flops 2, 3 is applied to reset PLO Decode Generator 6 and to a converter stage 4 [converting EC logic to TT logic as known in the art—e.g., converter chip #MC 10125], and thence to one input node of a single-shot multivibrator 5. The other input node of multivibrator 5 receives the 10 MHz clock signal as indicated. Multivibrator 5 is adapted, as further described below, to provide an output signal p-u adapted to disable the power amplifier in the disk drive system and thus prevent any damage to the head-disk assembly [HDA] as known in the art.

In addition, PLO Decode stage 6 is provided for receiving VCO signals and other PLL control signals as indicated, and responsively providing an output to the phase detector 41 of the phase lock look arrangement, as well as applying a "PLO Decode" signal to a gate (FIG. 1). Stage 6 is adapted to be reset by the mentioned outputs p-e from flip/flops 2, 3 as known in the art. It will be further understood that this PLO-Lock Detector PLD is adapted as an "PLO" unsafe detection" circuit [and part of the phase lock loop arrangement of the servo] to sample "position" and "position quadrature" pulses periodically [e.g., preferably eight times per servo frame, here]. As long as the PLL is "in-lock" and the VCO clock is synchronized to incoming servo data [−R, +R], a "high" level will be clocked-in to the two flip/flops 2, 3 [these flip/flops 2, 3 may be on one chip, such as #MC 10131].

But, if the timing of any of these position pulses is disturbed, a "low" level will be clocked-in to the flip/flops 2, 3 and a "PLO timing error" [signal e] will thus be detected. The PLO timing error signal p-e (output of the flip/flop stage 2,3) triggers a "re-triggerable" single shot multivibrator 5. After loss of synchronization, the sampling of the servo frame is done at random. Therefor, the PLO timing error will be a series of random pulses which will keep re-triggering the single shot 5. When the PLO regains "lock", the single shot 5 will no longer be triggered and its output ["PLO unsafe pulse", p-u] will go "high". Thus, multivibrator 5 ensures that the PLO has regained "lock" for the duration of one single shot pulse-width.

Workers will appreciate that this design is able to quickly and accurately determine "loss of lock" in a PL loop. The PLO "unlock detection" will protect customer data by disabling write current and preventing erasure. Further, the circuit makes it possible to disable the power amplifier and thus prevent any damage to the HDA as workers in the art will understand.

Workers will appreciate such an arrangement for detecting loss of phase/frequency lock in a phase lock loop arrangement—and will appreciate how relatively simple it is to monitor the timing between the VCO clock and the digitized carrier signal. Note that if the VCO "locks" to a harmonic of the carrier's signal, timing deviation is immediately detected. Note also that "frequency lock" is also detectable by this circuit.

Workers will visualize modifications of this technique; for instance one may compare "raw" servo data before digitizing with the other clock signals from the VCO.

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein are also applicable to other high density disk files, and/or applicable for enhancing other forms of related servo systems.

The above examples of possible variations of the present invention are merely illustrative. Accordingly, the present invention is to be considered as including all possible modifications and variations coming within the scope of the invention as defined by the appended claims.

What is claimed is:

1. A disk drive servo system phase lock loop arrangement including a phase lock loop (PLL) circuit including means for generating position signals, means for generating VCO clock signals, and PLD means for receiving and sampling said position signals and said clock signals and detecting synchronization ("lock") thereof and asynchronization ("loss-of-lock") thereof, said PLD means thus being adapted to monitor the timing between signals, so that timing synchronism is detected and "lock" indicated when the VCO "locks" to a harmonic of the position signal, and timing deviation detected and "loss-of-lock" indicated when asynchronism occurs:

this "loss-of-lock" indication being arranged to disable write current and to prevent data erasure.

2. The invention of claim 1 wherein said indication of "loss of lock" is further arranged to interrupt power to an associated head-disk assembly and thus prevent damage thereto upon "loss of lock."

3. The invention of claim 2 wherein phase lock oscillation timing error signals are provided wherein said position signals are stored in a prescribed storage means, this storage means being arranged to provide output therefrom upon coincidence occurrence of said phase lock oscillator timing error signals, this output being applied to a re-triggerable one shot multivibrator stage along with normal ones of said clock signals; this stage being adapted, in turn, to provide "unsafe" output signals until cessation of these input timing error signals, whereupon said multivibrator stage output will shift to a "safe" level representing regain of oscillator "lock".

4. The invention of claim 3 wherein said circuit is arranged to sample position and position quadrature pulses periodically in every servo cycle so that as long as the phase lock loop is "in lock" and the VCO clock is synchronized to incoming servo data, a "FIRST signal" level will be clocked-in to said storage stage, so that, if the timing of any of these position, position quadrature pulses is disturbed, a "SECOND" lower signal level will be clocked-in to said storage stage which, in turn, will provide error output signals to said multivibrator to, in turn, trigger "unsafe" output signals therefrom, this continuing until said position/position quadrature signals are no longer disturbed in timing, whereupon said multivibrator will shift its output from "unsafe" to "safe".

5. A disk drive servo system phase lock loop arrangement including a phase lock loop (PLL) circuit including means for generating position signals, means for generating VCO clock signals, and PLD means for receiving and sampling said position signals and said clock signals and detecting synchronization ("lock") thereof and asynchronization ("loss-of-lock") thereof, said PLD means thus being adapted to monitor the timing between signals so that timing synchronism is detected and "lock" indicated when the VCO "locks" to a harmonic of the carrier signal, and timing deviation detected and "loss-of-lock" indicated when asynchronism occurs; the circuit also including prescribed storage means and re-triggerable one-shot multivibrator means, the storage means adapted to provide output therefrom upon coincident-occurrence of phase lock oscillator timing error signals; this output being applied to said multivibrator stage along with normal clock signals, this multivibrator stage being adapted to, in turn, provide "unsafe" output signals until cessation of these input timing error signals, whereupon said multivibrator stage output will shift to a "safe" level representing regain of oscillator "lock".

6. The invention of claim 5 wherein the detection circuit is arranged to disable write current and prevent data erasure on recording surface means of the disk drive.

7. The invention of claim 6 wherein detection of "loss of lock" is further arranged to interrupt power to the head-disk assembly and thus prevent any damage thereto upon loss of lock.

8. The invention of claim 5 wherein said circuit is arranged to sample "position" and "position quadrature" pulses periodically in every servo frame so that, as long as the phase-lock-loop is "in lock" and the VCO clock is synchronized to incoming servo data, a "First" signal level will be clocked-in to said storage stage, wherein, if the timing of any of these position, position quadrature pulses is disturbed, a "Second", lower level signal will be clocked-in to said storage stage, which, in turn, will provide "error" output signals to multivibrator, and so trigger "unsafe" output signals therefrom, this continuing until said "position", "position quadrature" signals are no longer disturbed in timing, whereupon said multivibrator will shift its output from said "unsafe" to "safe" level.

9. The invention of claim 8 wherein the storage stage comprises flip-flop means.

* * * * *